(12) United States Patent
Pabst et al.

(10) Patent No.: US 7,946,591 B2
(45) Date of Patent: May 24, 2011

(54) COMBINED LABYRINTH SEAL AND SCREW-TYPE GASKET BEARING SEALING ARRANGEMENT

(75) Inventors: Otto Pabst, Bolzano (IT); Franco Gadrino, Turin (IT); Michael Kleinlercher, Steinach (AT)

(73) Assignee: Wilic S.AR.L., Luxembourg (LU)

( * ) Notice: Subject to any disclaimer, the term of this patent is extended or adjusted under 35 U.S.C. 154(b) by 531 days.

(21) Appl. No.: 12/067,773

(22) PCT Filed: Sep. 21, 2006

(86) PCT No.: PCT/IB2006/002619
§ 371 (c)(1),
(2), (4) Date: Mar. 21, 2008

(87) PCT Pub. No.: WO2007/034305
PCT Pub. Date: Mar. 29, 2007

(65) Prior Publication Data
US 2008/0246224 A1    Oct. 9, 2008

(30) Foreign Application Priority Data

Sep. 21, 2005   (IT) .............. BZ2005A0049
Nov. 29, 2005   (IT) .............. BZ2005A0062
Nov. 29, 2005   (IT) .............. BZ2005A0063

(51) Int. Cl.
*F16J 15/16*    (2006.01)
(52) U.S. Cl. .............. 277/417; 277/354; 415/174.5
(58) Field of Classification Search ............... 277/354, 277/417, 421, 346; 415/173.4, 173.5, 174.4, 415/174.5, 230
See application file for complete search history.

(56) References Cited

U.S. PATENT DOCUMENTS

| 450,004 | A | | 4/1891 | Daley |
| 1,505,647 | A | | 8/1924 | Junggren |
| 1,672,013 | A | | 6/1925 | Vroom |
| 1,720,696 | A | * | 7/1929 | Simpson ............... 277/346 |
| 1,857,961 | A | * | 5/1932 | Lamb ................... 277/413 |

(Continued)

FOREIGN PATENT DOCUMENTS

CA    2 404 939    4/2004

(Continued)

OTHER PUBLICATIONS

International Search Report from corresponding foreign application (PCT/IB2006/002619), dated Feb. 6, 2007.

(Continued)

*Primary Examiner* — Shane Bomar
*Assistant Examiner* — Robert E Fuller
(74) *Attorney, Agent, or Firm* — K&L Gates LLP

(57) ABSTRACT

A bearing sealing arrangement for rotating machines uses a radially-acting labyrinth seal (2) to minimize bearing lubricant leakage and an axially-acting screw-type gasket (3) to return what fluid escapes through the labyrinth seal to the bearing (10). In embodiments, the labyrinth seal uses rings (4) with plastic wear surfaces formed about internal metal bands, the plastic forming corresponding profiles on the ends (27,28) of the bands so that the profiles interlock when overlapped to form the rings. The screw-type gasket preferably includes rotor-mounted helical fillets (22) formed in a section (21) that is retained in a seat (20) on the rotor. The section in embodiments is retained by inserting a ring-shaped key (23) into the section, thereby forcing the section into undercuts of the seat. The arrangement is particularly useful in wind machines, such as wind-turbines.

15 Claims, 3 Drawing Sheets

U.S. PATENT DOCUMENTS

| | | | |
|---|---|---|---|
| 1,894,357 A | 1/1933 | Manikowske et al. | |
| 1,948,854 A | 2/1934 | Heath | |
| 1,979,813 A | 11/1934 | Reis | |
| 2,006,172 A | 6/1935 | Klappauf | |
| 2,040,218 A | 5/1936 | Soderberg | |
| 2,177,801 A | 10/1939 | Erren | |
| 2,469,734 A | 5/1949 | Ledwith | |
| 2,496,897 A | 2/1950 | Strickland | |
| 2,655,611 A | 10/1953 | Sherman | |
| 2,739,253 A | 3/1956 | Plumb | |
| 2,806,160 A | 9/1957 | Brainard | |
| 2,842,214 A | 7/1958 | Prewitt | |
| 2,903,610 A | 9/1959 | Bessiere | |
| 3,004,782 A | 10/1961 | Meermans | |
| 3,072,813 A | 1/1963 | Reijnst et al. | |
| 3,083,311 A | 3/1963 | Krasnow | |
| 3,131,942 A | 5/1964 | Ertaud | |
| 3,168,686 A | 2/1965 | King et al. | |
| 3,221,195 A | 11/1965 | Hoffmann | |
| 3,363,910 A | 1/1968 | Toronchuk | |
| 3,364,523 A | 1/1968 | Schippers | |
| 3,392,910 A | 7/1968 | Tanzberger | |
| 3,468,548 A | 9/1969 | Webb | |
| 3,700,247 A | 10/1972 | Butler | |
| 3,724,861 A | 4/1973 | Lesiecki | |
| 3,746,349 A | 7/1973 | Smale | |
| 3,748,089 A | 7/1973 | Boyer et al. | |
| 3,774,982 A * | 11/1973 | Nakamura et al. | 384/480 |
| 3,789,252 A | 1/1974 | Abegg | |
| 3,841,643 A * | 10/1974 | McLean | 277/420 |
| 3,860,843 A | 1/1975 | Kawasaki et al. | |
| 3,942,026 A | 3/1976 | Carter | |
| 3,963,247 A | 6/1976 | Nommensen | |
| 3,968,969 A | 7/1976 | Mayer | |
| 4,022,479 A | 5/1977 | Orlowski | |
| 4,061,926 A | 12/1977 | Peed | |
| 4,087,698 A | 5/1978 | Myers | |
| 4,273,343 A | 6/1981 | Visser | |
| 4,289,970 A | 9/1981 | Deibert | |
| 4,291,235 A | 9/1981 | Bergey, Jr. et al. | |
| 4,292,532 A | 9/1981 | Leroux | |
| 4,336,649 A | 6/1982 | Glaser | |
| 4,339,874 A | 7/1982 | Mc'Carty et al. | |
| 4,348,604 A | 9/1982 | Thode | |
| 4,350,897 A | 9/1982 | Benoit | |
| 4,354,126 A | 10/1982 | Yates | |
| 4,368,895 A | 1/1983 | Okamoto | |
| 4,398,773 A | 8/1983 | Boden et al. | |
| 4,406,466 A * | 9/1983 | Geary, Jr. | 277/400 |
| 4,452,046 A | 6/1984 | Valentin | |
| 4,482,831 A | 11/1984 | Notaras et al. | |
| 4,490,093 A | 12/1984 | Chertok et al. | |
| 4,517,483 A | 5/1985 | Hucker et al. | |
| 4,517,484 A | 5/1985 | Dacier | |
| 4,521,026 A | 6/1985 | Eide | |
| 4,585,950 A | 4/1986 | Lund | |
| 4,613,779 A | 9/1986 | Meyer | |
| 4,638,200 A | 1/1987 | Le Corre et al. | |
| 4,648,801 A | 3/1987 | Wilson | |
| 4,694,654 A | 9/1987 | Kawamura | |
| 4,700,096 A | 10/1987 | Epars | |
| 4,714,852 A | 12/1987 | Kawada et al. | |
| 4,720,640 A | 1/1988 | Anderson et al. | |
| 4,722,661 A | 2/1988 | Mizuno | |
| 4,724,348 A | 2/1988 | Stokes | |
| 4,761,590 A | 8/1988 | Kaszman | |
| 4,792,712 A | 12/1988 | Stokes | |
| 4,801,244 A | 1/1989 | Stahl | |
| 4,866,321 A | 9/1989 | Blanchard et al. | |
| 4,900,965 A | 2/1990 | Fisher | |
| 4,906,060 A | 3/1990 | Claude | |
| 4,973,868 A | 11/1990 | Wust | |
| 4,976,587 A | 12/1990 | Johnston et al. | |
| 5,004,944 A | 4/1991 | Fisher | |
| 5,063,318 A | 11/1991 | Anderson | |
| 5,080,157 A * | 1/1992 | Oerter | 152/417 |
| 5,090,711 A | 2/1992 | Becker | |
| 5,091,668 A | 2/1992 | Cuenot et al. | |
| 5,177,388 A | 1/1993 | Hotta et al. | |
| 5,191,255 A | 3/1993 | Kloosterhouse et al. | |
| 5,275,139 A | 1/1994 | Rosenquist | |
| 5,280,209 A | 1/1994 | Leupold et al. | |
| 5,281,094 A | 1/1994 | McCarty et al. | |
| 5,298,827 A | 3/1994 | Sugiyama | |
| 5,302,876 A | 4/1994 | Iwamatsu et al. | |
| 5,311,092 A | 5/1994 | Fisher | |
| 5,315,159 A | 5/1994 | Gribnau | |
| 5,331,238 A | 7/1994 | Johnsen | |
| 5,410,997 A | 5/1995 | Rosenquist | |
| 5,419,683 A | 5/1995 | Peace | |
| 5,456,579 A | 10/1995 | Olson | |
| 5,483,116 A | 1/1996 | Kusase et al. | |
| 5,506,453 A | 4/1996 | McCombs | |
| 5,579,800 A | 12/1996 | Walker | |
| 5,609,184 A | 3/1997 | Apel et al. | |
| 5,663,600 A | 9/1997 | Back et al. | |
| 5,670,838 A | 9/1997 | Everton | |
| 5,696,419 A | 12/1997 | Rakestraw et al. | |
| 5,704,567 A | 1/1998 | Maglieri | |
| 5,746,576 A | 5/1998 | Bayly | |
| 5,777,952 A | 7/1998 | Nishimura et al. | |
| 5,783,894 A | 7/1998 | Wither | |
| 5,793,144 A | 8/1998 | Kusase et al. | |
| 5,798,632 A | 8/1998 | Muljadi | |
| 5,801,470 A | 9/1998 | Johnson et al. | |
| 5,811,908 A | 9/1998 | Iwata et al. | |
| 5,814,914 A | 9/1998 | Caamaño | |
| 5,834,690 A | 11/1998 | Bastiaansenw | |
| 5,844,333 A | 12/1998 | Sheerin | |
| 5,844,341 A | 12/1998 | Spooner et al. | |
| 5,857,762 A | 1/1999 | Schwaller | |
| 5,886,441 A | 3/1999 | Uchida et al. | |
| 5,889,346 A | 3/1999 | Uchida et al. | |
| 5,894,183 A | 4/1999 | Borchert | |
| 5,925,964 A | 7/1999 | Kusase et al. | |
| 5,952,755 A | 9/1999 | Lubas | |
| 5,961,124 A | 10/1999 | Muller | |
| 5,973,435 A | 10/1999 | Irie et al. | |
| 5,986,374 A | 11/1999 | Kawakami | |
| 5,986,378 A | 11/1999 | Caamano | |
| 6,013,968 A | 1/2000 | Lechner et al. | |
| 6,037,692 A | 3/2000 | Miekka et al. | |
| 6,064,123 A | 5/2000 | Gislason | |
| 6,067,227 A | 5/2000 | Katsui et al. | |
| 6,089,536 A | 7/2000 | Watanabe et al. | |
| 6,093,984 A | 7/2000 | Shiga et al. | |
| 6,127,739 A | 10/2000 | Appa | |
| 6,172,429 B1 | 1/2001 | Russell | |
| 6,177,746 B1 | 1/2001 | Tupper et al. | |
| 6,193,211 B1 | 2/2001 | Watanabe et al. | |
| 6,194,799 B1 | 2/2001 | Miekka et al. | |
| 6,215,199 B1 | 4/2001 | Lysenko et al. | |
| 6,232,673 B1 | 5/2001 | Schoo et al. | |
| 6,278,197 B1 | 8/2001 | Appa | |
| 6,285,090 B1 | 9/2001 | Brutsaert et al. | |
| 6,326,711 B1 | 12/2001 | Yamaguchi et al. | |
| 6,365,994 B1 | 4/2002 | Watanabe et al. | |
| 6,373,160 B1 | 4/2002 | Schrödl | |
| 6,376,956 B1 | 4/2002 | Hosoya | |
| 6,378,839 B2 | 4/2002 | Watanabe et al. | |
| 6,384,504 B1 | 5/2002 | Elrhart et al. | |
| 6,417,578 B1 | 7/2002 | Chapman et al. | |
| 6,428,011 B1 | 8/2002 | Oskouei | |
| 6,452,287 B1 | 9/2002 | Looker | |
| 6,452,301 B1 | 9/2002 | Van Dine et al. | |
| 6,455,976 B1 | 9/2002 | Nakano | |
| 6,472,784 B2 | 10/2002 | Miekka et al. | |
| 6,474,653 B1 | 11/2002 | Hintenlang et al. | |
| 6,476,513 B1 | 11/2002 | Gueorguiev | |
| 6,483,199 B2 | 11/2002 | Umemoto et al. | |
| 6,492,743 B1 | 12/2002 | Appa | |
| 6,492,754 B1 | 12/2002 | Weiglhofer et al. | |
| 6,499,532 B1 | 12/2002 | Williams | |
| 6,504,260 B1 | 1/2003 | Debleser | |
| 6,515,390 B1 | 2/2003 | Lopatinsky et al. | |
| 6,520,737 B1 | 2/2003 | Fischer et al. | |
| 6,548,932 B1 | 4/2003 | Weiglhofer et al. | |

| | | |
|---|---|---|
| 6,590,312 B1 | 7/2003 | Seguchi et al. |
| 6,603,232 B2 | 8/2003 | Van Dine et al. |
| 6,617,747 B1 | 9/2003 | Petersen |
| 6,629,358 B2 | 10/2003 | Setiabudi et al. |
| 6,664,692 B1 | 12/2003 | Kristoffersen |
| 6,676,122 B1 | 1/2004 | Wobben |
| 6,683,397 B2 | 1/2004 | Gauthier et al. |
| 6,700,260 B2 | 3/2004 | Hsu et al. |
| 6,700,288 B2 | 3/2004 | Smith |
| 6,707,224 B1 | 3/2004 | Petersen |
| 6,720,688 B1 | 4/2004 | Schiller |
| 6,727,624 B2 | 4/2004 | Morita et al. |
| 6,746,217 B2 | 6/2004 | Kim et al. |
| 6,759,758 B2 | 7/2004 | Martinez |
| 6,762,525 B1 | 7/2004 | Maslov et al. |
| 6,781,276 B1 | 8/2004 | Stiesdal et al. |
| 6,784,564 B1 | 8/2004 | Wobben |
| 6,794,781 B2 | 9/2004 | Razzell et al. |
| 6,828,710 B1 | 12/2004 | Gabrys |
| 6,856,042 B1 | 2/2005 | Kubota |
| 6,879,075 B2 | 4/2005 | Calfo et al. |
| 6,888,262 B2 | 5/2005 | Blakemore |
| 6,891,299 B2 | 5/2005 | Coupart et al. |
| 6,903,466 B1 | 6/2005 | Mercier et al. |
| 6,903,475 B2 | 6/2005 | Ortt et al. |
| 6,906,444 B2 | 6/2005 | Hattori et al. |
| 6,911,741 B2 | 6/2005 | Pettersen et al. |
| 6,921,243 B2 | 7/2005 | Canini et al. |
| 6,931,834 B2 | 8/2005 | Jones |
| 6,932,349 B2 * | 8/2005 | Coppola ............... 277/409 |
| 6,933,645 B1 | 8/2005 | Watson |
| 6,933,646 B2 | 8/2005 | Kinoshita |
| 6,942,454 B2 | 9/2005 | Ohlmann |
| 6,945,747 B1 | 9/2005 | Miller |
| 6,949,860 B2 | 9/2005 | Hama et al. |
| 6,951,443 B1 | 10/2005 | Blakemore |
| 6,972,498 B2 | 12/2005 | Jamieson et al. |
| 6,983,529 B2 | 1/2006 | Ortt et al. |
| 6,984,908 B2 | 1/2006 | Rinholm et al. |
| 6,987,342 B2 | 1/2006 | Hans |
| 6,998,729 B1 | 2/2006 | Wobben |
| 7,004,724 B2 | 2/2006 | Pierce et al. |
| 7,008,172 B2 | 3/2006 | Selsam |
| 7,008,348 B2 | 3/2006 | LaBath |
| 7,016,006 B2 | 3/2006 | Song |
| 7,021,905 B2 | 4/2006 | Torrey et al. |
| 7,028,386 B2 | 4/2006 | Kato et al. |
| 7,033,139 B2 | 4/2006 | Wobben |
| 7,038,343 B2 | 5/2006 | Agnes et al. |
| 7,042,109 B2 | 5/2006 | Gabrys |
| 7,057,305 B2 | 6/2006 | Krüger-Gotzmann et al. |
| 7,075,192 B2 | 7/2006 | Bywaters et al. |
| 7,081,696 B2 | 7/2006 | Ritchey |
| 7,088,024 B2 | 8/2006 | Agnes et al. |
| 7,091,642 B2 | 8/2006 | Agnes et al. |
| 7,095,128 B2 | 8/2006 | Canini et al. |
| 7,098,552 B2 | 8/2006 | McCoin |
| 7,109,600 B1 | 9/2006 | Bywaters et al. |
| 7,111,668 B2 | 9/2006 | Rürup |
| 7,116,006 B2 | 10/2006 | McCoin |
| 7,119,469 B2 | 10/2006 | Ortt et al. |
| 7,154,191 B2 | 12/2006 | Jansen et al. |
| 7,161,260 B2 | 1/2007 | Krüger-Gotzmann et al. |
| 7,166,942 B2 | 1/2007 | Yokota |
| 7,168,248 B2 | 1/2007 | Sakamoto et al. |
| 7,179,056 B2 | 2/2007 | Sieffriedsen |
| 7,180,204 B2 | 2/2007 | Grant et al. |
| 7,183,665 B2 | 2/2007 | Bywaters et al. |
| 7,196,446 B2 | 3/2007 | Hans |
| 7,205,678 B2 | 4/2007 | Casazza et al. |
| 7,217,091 B2 | 5/2007 | LeMieux |
| 7,259,472 B2 | 8/2007 | Miyake et al. |
| 7,281,501 B2 | 10/2007 | Leufen et al. |
| 7,285,890 B2 | 10/2007 | Jones et al. |
| 7,323,792 B2 | 1/2008 | Sohn |
| 7,377,163 B2 | 5/2008 | Miyagawa |
| 7,385,305 B2 | 6/2008 | Casazza et al. |
| 7,385,306 B2 | 6/2008 | Casazza et al. |
| 7,392,988 B2 | 7/2008 | Moldt |
| 7,431,567 B1 | 10/2008 | Bevington et al. |
| 7,443,066 B2 | 10/2008 | Salamah et al. |
| 7,458,261 B2 | 12/2008 | Miyagawa |
| 7,482,720 B2 | 1/2009 | Gordon et al. |
| 7,548,008 B2 | 6/2009 | Jansen et al. |
| 7,687,932 B2 | 3/2010 | Casazza et al. |
| 2002/0047418 A1 | 4/2002 | Seguchi et al. |
| 2002/0047425 A1 | 4/2002 | Coupart et al. |
| 2002/0056822 A1 | 5/2002 | Watanabe et al. |
| 2002/0063485 A1 | 5/2002 | Lee et al. |
| 2002/0089251 A1 | 7/2002 | Tajima et al. |
| 2002/0148453 A1 | 10/2002 | Watanabe et al. |
| 2003/0011266 A1 | 1/2003 | Morita et al. |
| 2003/0102677 A1 | 6/2003 | Becker et al. |
| 2003/0137149 A1 | 7/2003 | Northrup et al. |
| 2003/0230899 A1 | 12/2003 | Martinez |
| 2004/0086373 A1 | 5/2004 | Page, Jr. |
| 2004/0094965 A1 | 5/2004 | Kirkegaard et al. |
| 2004/0119292 A1 | 6/2004 | Datta et al. |
| 2004/0150283 A1 | 8/2004 | Calfo et al. |
| 2004/0151575 A1 | 8/2004 | Pierce et al. |
| 2004/0151577 A1 | 8/2004 | Pierce et al. |
| 2004/0189136 A1 | 9/2004 | Kolomeitsev et al. |
| 2005/0002783 A1 | 1/2005 | Hiel et al. |
| 2005/0002787 A1 | 1/2005 | Wobben |
| 2005/0082839 A1 | 4/2005 | McCoin |
| 2005/0230979 A1 | 10/2005 | Bywaters et al. |
| 2005/0280264 A1 | 12/2005 | Nagy |
| 2006/0000269 A1 | 1/2006 | LeMieux et al. |
| 2006/0001269 A1 | 1/2006 | Jansen et al. |
| 2006/0006658 A1 | 1/2006 | McCoin |
| 2006/0012182 A1 | 1/2006 | McCoin |
| 2006/0028025 A1 | 2/2006 | Kikuchi et al. |
| 2006/0066110 A1 | 3/2006 | Jansen et al. |
| 2006/0071575 A1 | 4/2006 | Jansen et al. |
| 2006/0091735 A1 | 5/2006 | Song et al. |
| 2006/0125243 A1 | 6/2006 | Miller |
| 2006/0131985 A1 | 6/2006 | Qu et al. |
| 2006/0152012 A1 | 7/2006 | Wiegel et al. |
| 2006/0152015 A1 | 7/2006 | Bywaters et al. |
| 2006/0152016 A1 | 7/2006 | Bywaters et al. |
| 2007/0020109 A1 | 1/2007 | Takahashi et al. |
| 2007/0187954 A1 | 8/2007 | Struve et al. |
| 2007/0187956 A1 | 8/2007 | Wobben |
| 2007/0222226 A1 | 9/2007 | Casazza |
| 2007/0222227 A1 | 9/2007 | Casazza |
| 2008/0050234 A1 | 2/2008 | Ingersoll et al. |
| 2008/0107526 A1 | 5/2008 | Wobben |
| 2008/0197636 A1 | 8/2008 | Tilscher et al. |
| 2008/0197638 A1 | 8/2008 | Wobben |
| 2008/0290664 A1 | 11/2008 | Kruger |
| 2008/0309189 A1 | 12/2008 | Pabst et al. |
| 2008/0315594 A1 | 12/2008 | Casazza |
| 2009/0096309 A1 | 4/2009 | Pabst et al. |
| 2009/0302702 A1 | 12/2009 | Pabst et al. |
| 2010/0019502 A1 | 1/2010 | Pabst et al. |
| 2010/0026010 A1 | 2/2010 | Pabst |
| 2010/0117362 A1 | 5/2010 | Vihriala et al. |
| 2010/0123318 A1 | 5/2010 | Casazza et al. |

FOREIGN PATENT DOCUMENTS

| | | |
|---|---|---|
| CA | 2518742 | 9/2004 |
| CN | 1554867 | 12/2004 |
| DE | 1130913 | 6/1962 |
| DE | 2 164 135 | 7/1973 |
| DE | 2 322 458 | 11/1974 |
| DE | 2506160 | 8/1976 |
| DE | 2922885 | 12/1980 |
| DE | 3638129 | 5/1988 |
| DE | 3718954 | 12/1988 |
| DE | 3844505 | 7/1990 |
| DE | 3903399 | 8/1990 |
| DE | 4304577 | 8/1994 |
| DE | 4 402 184 | 8/1995 |
| DE | 4415570 | 11/1995 |
| DE | 4444757 | 6/1996 |
| DE | 29706980 | 7/1997 |
| DE | 19636591 | 3/1998 |
| DE | 19644355 | 4/1998 |

| | | | | | |
|---|---|---|---|---|---|
| DE | 19652673 | 6/1998 | JP | 5122912 | 5/1993 |
| DE | 19711869 | 9/1998 | JP | 6002970 | 1/1994 |
| DE | 19748716 | 11/1998 | JP | 6269141 | 9/1994 |
| DE | 29819391 | 2/1999 | JP | 10-070858 | 3/1998 |
| DE | 19801803 | 4/1999 | JP | 11 236 977 | 8/1999 |
| DE | 19932394 | 1/2001 | JP | 11-299197 | 10/1999 |
| DE | 19947915 | 4/2001 | JP | 2000-134885 | 5/2000 |
| DE | 19951594 | 5/2001 | JP | 2001-057750 | 2/2001 |
| DE | 10000370 | 7/2001 | JP | 2003453072 | 7/2003 |
| DE | 20102029 | 8/2001 | JP | 2004-153913 | 5/2004 |
| DE | 10219190 | 11/2003 | JP | 2004-297947 | 10/2004 |
| DE | 10246690 | 4/2004 | JP | 2005-006375 | 1/2005 |
| DE | 102004018524 | 11/2005 | JP | 2005-020906 | 1/2005 |
| DE | 102004028746 | 12/2005 | JP | 2005-312150 | 11/2005 |
| EP | 0013157 | 7/1980 | NL | 8 902 534 | 5/1991 |
| EP | 0 232 963 | 8/1987 | RU | 2 000 466 | 4/1991 |
| EP | 0313392 | 4/1989 | RU | 2229621 | 5/2004 |
| EP | 0 627 805 | 12/1994 | WO | 84/02382 | 6/1984 |
| EP | 1108888 | 6/2001 | WO | 91/05953 | 5/1991 |
| EP | 1167754 | 1/2002 | WO | 92/12343 | 7/1992 |
| EP | 1289097 | 3/2003 | WO | WO9730504 | 8/1997 |
| EP | 1291521 | 3/2003 | WO | WO9733357 | 9/1997 |
| EP | 1309067 | 5/2003 | WO | WO9840627 | 9/1998 |
| EP | 1363019 | 11/2003 | WO | WO9930031 | 6/1999 |
| EP | 1 375 913 | 1/2004 | WO | WO9933165 | 7/1999 |
| EP | 1 394 406 | 3/2004 | WO | WO9937912 | 7/1999 |
| EP | 1 394 451 | 3/2004 | WO | WO9939426 | 8/1999 |
| EP | 1589222 | 10/2005 | WO | WO0001056 | 1/2000 |
| EP | 1612415 | 1/2006 | WO | 01/06623 | 1/2001 |
| EP | 1641102 | 3/2006 | WO | WO0106121 | 1/2001 |
| EP | 1677002 | 7/2006 | WO | WO0107784 | 2/2001 |
| EP | 1772624 | 4/2007 | WO | WO0121956 | 3/2001 |
| EP | 1780409 | 5/2007 | WO | WO0125631 | 4/2001 |
| EP | 1829762 | 9/2007 | WO | WO0129413 | 4/2001 |
| ES | 2140301 | 2/2000 | WO | 01/35517 | 5/2001 |
| FR | 806292 | 12/1936 | WO | WO0134973 | 5/2001 |
| FR | 859844 | 12/1940 | WO | 01/69754 | 9/2001 |
| FR | 1 348 765 | 1/1964 | WO | 02/33254 | 4/2002 |
| FR | 2401091 | 3/1979 | WO | WO02057624 | 7/2002 |
| FR | 2445053 | 7/1980 | WO | WO02083523 | 10/2002 |
| FR | 2519483 | 7/1983 | WO | WO03036084 | 5/2003 |
| FR | 2594272 | 8/1987 | WO | 03/067081 | 8/2003 |
| FR | 2760492 | 9/1998 | WO | WO03076801 | 9/2003 |
| FR | 2796671 | 1/2001 | WO | 2004/017497 | 2/2004 |
| FR | 2798168 | 3/2001 | WO | 2005/103489 | 11/2005 |
| FR | 2810374 | 12/2001 | WO | WO2006013722 | 2/2006 |
| FR | 2882404 | 8/2006 | WO | WO2006032515 | 3/2006 |
| GB | 191317268 | 3/1914 | WO | WO2008078342 | 7/2008 |
| GB | 859176 | 1/1961 | | | |
| GB | 1 524 477 | 9/1978 | | | |
| GB | 1 537 729 | 1/1979 | | | |
| GB | 2 041 111 | 9/1980 | | | |
| GB | 2 050 525 | 1/1981 | | | |
| GB | 2075274 | 11/1981 | | | |
| GB | 2131630 | 6/1984 | | | |
| GB | 2144587 | 3/1985 | | | |
| GB | 2 208 243 | 3/1989 | | | |
| GB | 2 266 937 | 11/1993 | | | |
| GB | 2 372 783 | 9/2002 | | | |
| JP | 57059462 | 4/1982 | | | |
| JP | 3145945 | 6/1991 | | | |

OTHER PUBLICATIONS

International Preliminary Report on Patentability from corresponding foreign application (PCT/IB2006/002619), dated Mar. 26, 2008.
International Examination Report from corresponding foreign application (PCT/IB2006/002619), dated Dec. 12, 2008.
Maxime Dubois, Study of TFPM machines with toothed rotor applied to direct-drive generators for wind turbines, 2004.
Variable Speed Gearless Wind Turbine (website), http://www.mhi.cojp/msmw/mw/en/gearless.html, viewed on Sep. 22, 2006.

* cited by examiner

COMBINED LABYRINTH SEAL AND SCREW-TYPE GASKET BEARING SEALING ARRANGEMENT

CROSS-REFERENCE TO OTHER APPLICATIONS

This is a National Phase of International Application No. PCT/IB2006/002619, filed on Sep. 21, 2006, which claims priority from Italian Patent Application No. BZ2005A000049 filed on Sep. 21, 2005, Italian Patent Application No. BZ2005A000062 filed on Nov. 29, 2005, and Italian Patent Application No. BZ2005A000063 filed on Nov. 29, 2005.

TECHNICAL FIELD

Embodiments relate to seals and gaskets, particularly as used around bearings in rotating machinery. More particularly, embodiments relate to non-contacting seal systems used in wind machines, such as wind turbines, wind mills, and the like.

BACKGROUND OF THE INVENTION

In rotating machinery, such as wind machines, bearings are used to support rotating components with as little friction as possible. To reduce friction, lubricants are often used in the bearings, but such lubricants must be retained within the bearings. Leakage can lead to increased friction, failure of the bearings, and contamination of areas and/or products adjacent the bearings. Thus, seals must be employed to retain the lubricant within the bearings.

Sealing in the bearing art can be done in a number of ways. For example, some bearings employ contacting seal systems, such as lip seal systems. These types of seals are not desirable for large diameter applications for several reasons. Because of the degree of wear these types of seals experience, the seals tend to weaken, particularly in the case of elastomeric materials. In the case of large gaskets, replacement is difficult, if at all possible, and very costly. To ease the difficulty of replacement, some known systems segment or subdivide such gaskets rather than making them a single piece. However, segmented gaskets can have issues, such as leakage at segment joints, with the seals they are supposed to provide, particularly along the segment joints.

An alternative to the problematic contacting seal system is the labyrinth seal. Various known labyrinth seals have been employed to reduce or eliminate the flow of fluids from one side of a seal to the other side of the seal. For example, in centrifugal air compressors, labyrinth seals are often employed to prevent the entry of lubricating oil into the compression chamber from bearings. However, for large diameter situations, labyrinth seals have not been economically practical since the required manufacturing tolerances are so precise. Additionally, because known labyrinth seals rely on the formation of vortices in the fluid against which they are employed, they typically will only greatly reduce, rather than eliminate, fluid leakage, which is not desirable in some installations.

To overcome the leakage of labyrinth seals, certain known installations instead employ pumping gaskets that push the fluid back toward the fluid reservoir (the bearing). However, known gaskets that actively pump lubricant, particularly in large-diameter applications, are expensive, difficult to manufacture, and are susceptible to defects.

SUMMARY OF THE INVENTION

To fill the need for a non-contacting seal system that provides total fluid leakage prevention, embodiments disclosed herein employ a combination of a labyrinth seal and a pumping gasket in a novel manner that results in an economical, relatively easy to manufacture sealing system. The sealing system of embodiments is substantially maintenance free and long-lived. Embodiments are particularly suited to large diameter applications, such as wind machines. The labyrinth seal reduces fluid flow while the pumping gasket, preferably a screw-type gasket, forces the fluid toward the bearing. A particularly effective arrangement of embodiments is to use a labyrinth seal to impede flow in a radial direction in combination with a pumping gasket to prevent flow in the axial direction and to return fluid to the bearing.

BRIEF DESCRIPTION OF THE DRAWINGS

Embodiments will be described while referring to the accompanying drawings.

DETAILED DESCRIPTION OF THE INVENTION

Figure 1:
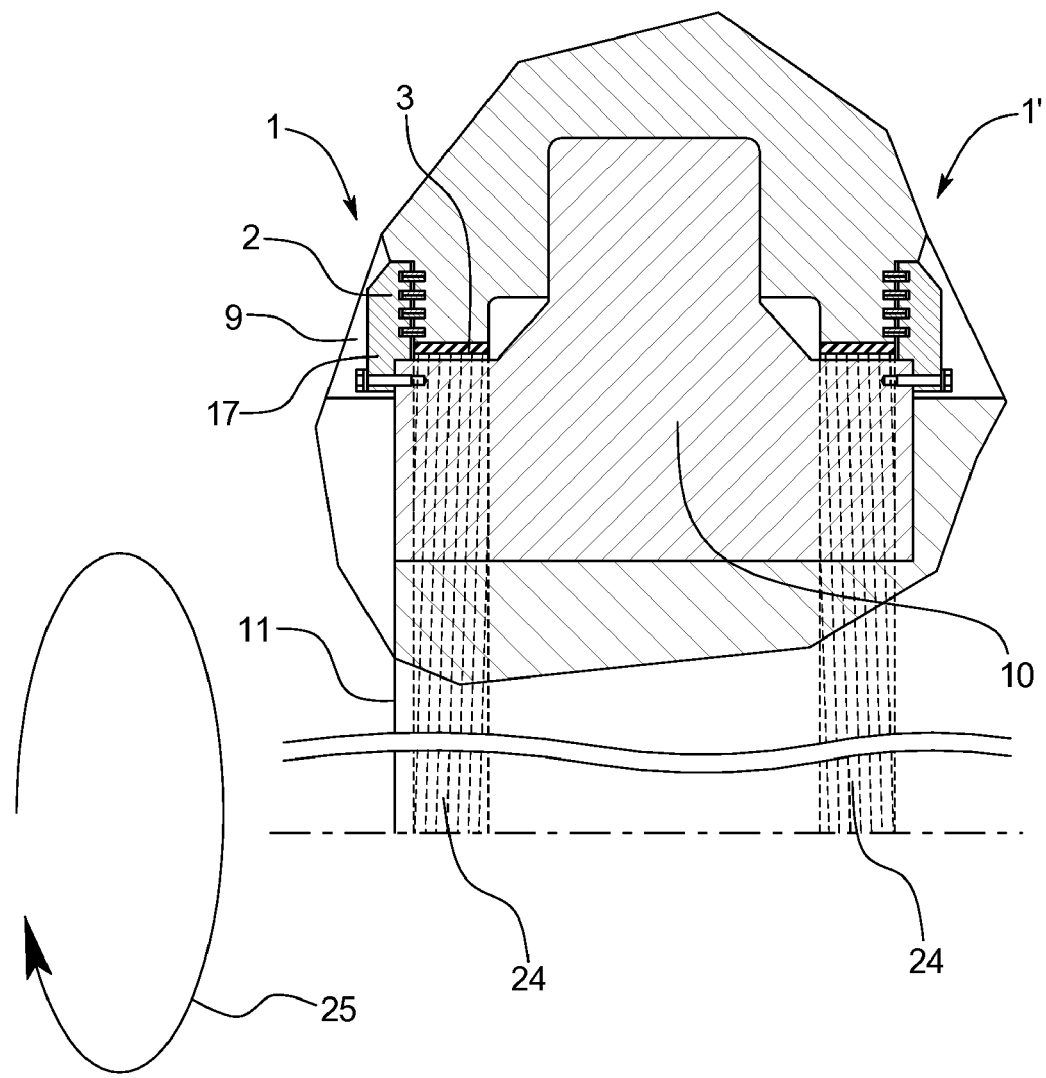
FIG. 1 shows a schematic partial section through a system for installation of a bearing in a wind turbine.
Figure 2:
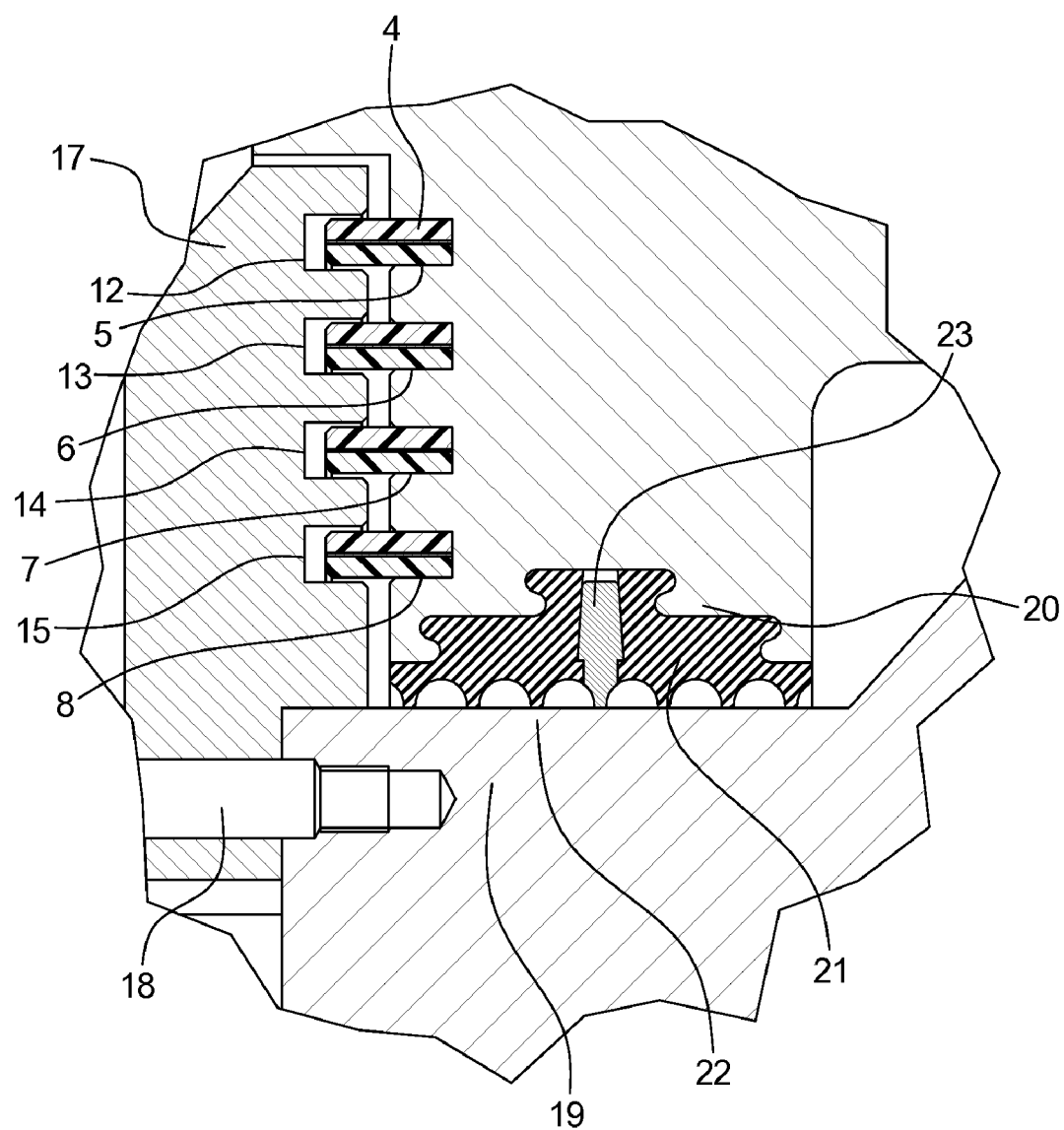
FIG. 2 shows a detail of the portion of FIG. 1 in which seal groups of embodiments is installed.
Figure 3:
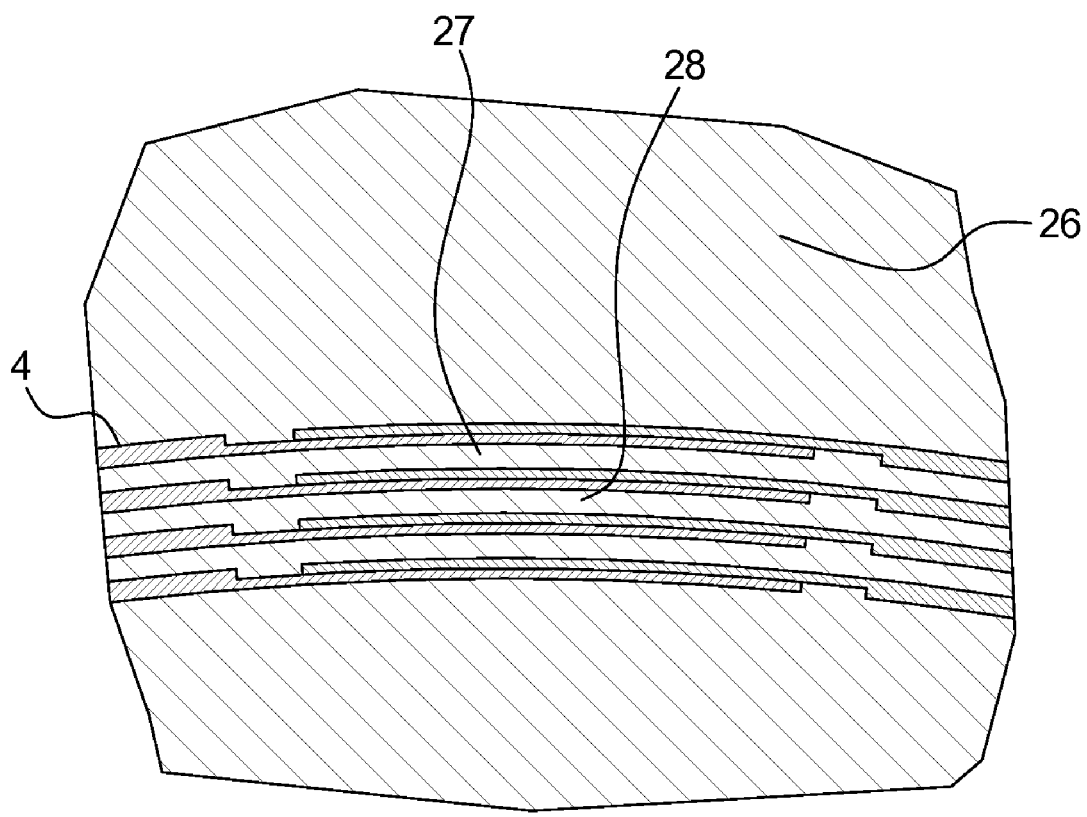
FIG. 3 shows a schematic partial front view of a radial rotor band.

A rotating machine, such as a wind machine, typically includes a rotor 9 supported via a bearing 10 by a stator 11. The rotor 9 is supported by the bearing 10 for rotation relative to the stator 11. A group of seals 1, 1' on either side of the bearing 10 prevents the escape of lubricant from the bearing. Each group of seals is a non-contact sealing system or arrangement 1, 1' according to embodiments and includes a labyrinth seal 2 and a screw type gasket 3, as seen in FIGS. 1-3. The labyrinth seal 2 is arranged perpendicular to the axis of rotation of the rotor and mounted on facing radial surfaces of the rotor and stator. As discussed above, the labyrinth seal 2 provides fluid sealing in a radial direction. The screw gasket 3 is mounted on facing axial surfaces of the rotor and stator on opposed shoulders, the facing surfaces of the shoulders being parallel to the axis of rotation of the rotor.

The labyrinth seal 2 includes a plurality of rings 4 arranged concentrically in concentric grooves 5, 6, 7, and 8 in the surface of the rotor 9 supported by a bearing 10. The rings 4 of embodiments extend into facing grooves 12, 13, 14, and 15 made on a corresponding surface of the stator 11. For simplicity, various components are described as being on the rotor 9 and others on the stator 11, but it should be understood that the locations of these components can be switched in embodiments. Preferably, the rings 4 have some play in their respective radial grooves 12-15. As shown in FIG. 3, the rings 4 of embodiments are not closed, each having end portions 27, 28 with corresponding profiles such that the two end portions 27, 28 overlap to form a complete ring 4 once the ring 4 is installed in its respective groove 5-8. Preferably, the facing grooves 12-15 are formed in an insert 17 attached to the stator 11, such as with a screw 18 or the like.

On the rotor shoulder 19, a seat 20 is formed to hold the screw gasket 3. The shoulder 19 preferably includes undercuts or the like to retain a section 21 the screw gasket 3. According to embodiments, a ring-shaped key 23 inserted in the section 21 forces the section 21 into the undercuts. Preferably, the section 21 is made of an elastomeric material.

Fillets 22 are formed in an external surface of the section 21, which fillets 22 have a generally helical profile as they diametrally run along the inner periphery of the section 21, as seen, for example, in FIG. 1 and as indicated by reference numeral 24. In other words, the fillets 22 form threads on the inner surface of the rotor axial surface. The fillets 22 rotate with the rotor 9 such that their helical profiles 24 (threads) pump lubricant back toward the labyrinth seal 2.

In embodiments, the rings 4 are compound elements, each with an internal ring of a durable material, such as metal, around which a wear ring is formed. Preferably, the wear ring is made from plastic or another suitable material. The plastic wear ring can be molded about the inner durable ring or can be formed of parts attached to the durable inner ring, such as with adhesive.

Embodiments thus provide labyrinth seals 2 to prevent bearing contamination from external influences while greatly reducing leakage from the bearings while also providing screw gaskets 3 that return what fluid escapes the labyrinth seals 2 toward the bearings. While the labyrinth seal rings 4 use plastic wear components in embodiments, metal inner rings provide more durability. The screw gasket 3 of embodiments, with its ring-shaped key 23 acting with the undercuts 20 of the seat and the section 21, provide a relatively inexpensive pumping gasket with long life.

It will be appreciated that various of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A rotating machine comprising:
   a stator,
   a rotor configured to rotate relative to the stator,
   a bearing supporting the rotor, and
   a plurality of sealing systems including sealing systems on both sides of the bearing, each sealing system comprising:
      a radially-acting labyrinth seal including a plurality of components on a plurality of facing radial surfaces of the rotor and the stator; and
      an axially-acting screw gasket, wherein the axially-acting screw gasket includes:
         a section,
         a seat formed in the stator and into which the section is inserted, and
         a ring-shaped key inserted into the section to force and retain the section into the seat.

2. The rotating machine of claim 1, wherein the labyrinth seal comprises:
   a plurality of axially projecting rings,
   a corresponding plurality of grooves formed in the radial surface of the rotor and supporting the rings, and
   a corresponding plurality of facing grooves formed in the stator radial surface that faces the rotor radial surface, the rings project into the facing grooves.

3. The rotating machines of claim 2 wherein each ring comprises a band with corresponding, interlocking profiles on either end thereof such that the ends are configured to be joined to form the ring.

4. The rotating machine of claim 3, wherein each ring comprises:
   an inner ring of a first durable material, and
   a wear ring of a second durable material, said second durable material being less durable than the first durable material.

5. The rotating machine of claim 4, wherein the inner ring is metal and the wear ring is plastic.

6. The rotating machine of claim 4, wherein the wear ring is molded about the inner ring.

7. The rotating machine of claim 4, wherein the wear ring is attached to the inner ring with an adhesive.

8. The rotating machine of claim 1, wherein the screw gasket comprises a plurality of fillets mounted on the rotor, the fillets comprising a substantially helical profile diametrically along an inner periphery of the screw gasket.

9. A wind machine comprising:
   a rotor;
   a stator;
   a bearing; and
   a rotating machine bearing sealing arrangement including:
      a labyrinth seal mounted on a plurality of facing radially-extending surfaces of the rotor and the stator, and
      a screw-type gasket mounted on a plurality of facing axially-extending surfaces of the rotor and the stator on a side of the labyrinth seal opposite of the bearing, the stator axially-extending surface including:
         a section including a plurality of fillets mounted on the rotor axially-extending surface, the fillets having a substantially helical profile diametrically along the rotor axially-extending surface,
         a seat in which the section sits, the seat including a plurality of undercuts into which the section extends, and
         a ring-shaped key inserted into the section to bias the section into the undercuts to secure the section in the seat.

10. The wind machine of claim 9, wherein the labyrinth seal comprises a plurality of rings projecting from the rotor radially-extending surface and into corresponding facing grooves in the stator radially-extending surface.

11. The wind machine of claim 10, wherein the rings are mounted in grooves in the rotor radially-extending surface and each ring comprises a band with corresponding profiles formed in ends of said ring, the profiles configured to interlock when overlapped to form the ring.

12. The wind machine of claim 10, wherein the rings comprise wear surfaces formed about an internal ring, the wear surfaces being made of one material and the internal ring being made of another material.

13. The wind machine of claim 12, wherein the wear surfaces are plastic and the internal ring is metal.

14. A rotating machine bearing sealing arrangement comprising:
   a plurality of rings formed on a radially-extending surface of a rotor;
   a plurality of ring support grooves on the radially-extending surface of the rotor and supporting corresponding ones of the plurality of rings;
   a plurality of facing grooves on a radially-extending surface of a stator into which corresponding ones of the rings project substantially without contacting any portion of the facing grooves, wherein the rings and facing grooves form a radially-acting labyrinth seal;
   a seat formed in an axially-extending surface of the stator and including a plurality of undercuts;
   a section in the seat;
   a plurality of fillets of substantially helical diametrical profile formed on an outer surface of the section, the profile being configured to pump fluid toward the labyrinth seal when the rotor rotates relative to the stator; and a ring-shaped key inserted into the section and configured to force the section into the undercuts to secure the section in the seat, wherein the seat, the section, the fillets, and the ring-shaped key form an axially-acting screw-type gasket configured to return fluid escaping from the labyrinth seal.

15. A rotating machine comprising a stator, a rotor configured to rotate relative to the stator, a bearing supporting the rotor, and a bearing sealing arrangement on either side of the bearing, each sealing arrangement comprising:

a labyrinth seal mounted on a plurality of radially-extending surfaces of the rotor and the stator adjacent to the bearing, the labyrinth seal comprising:

a plurality of rings projecting from the rotor radially-extending surface and into corresponding facing grooves in the stator radially-extending surface, each ring including a band with a plurality of corresponding profiles formed in ends of said ring, the profiles configured to interlock when overlapped to form the ring, and each ring including a plurality of wear surfaces formed about an internal ring, the wear surfaces being made of one material and the internal rings being made of another material, and a plurality of grooves in the rotor radially-extending surface in which the rings are mounted; and a screw-type gasket mounted on axially-extending surfaces of the rotor and the stator on a side of the labyrinth seal opposite the bearing, the screw-type gasket comprising:

a plurality of fillets mounted on the rotor axially-extending surface, the fillets having a substantially helical profile diametrically along the rotor axially-extending surface, and a section mounted in a seat of the stator axially extending surface, the section including the fillets, the seat including a plurality of undercuts into which the section extends, and screw-type gasket including a ring-shaped key inserted into the section to bias the section into the undercuts to secure the section in the seat.

* * * * *